United States Patent [19]
Charych et al.

[11] Patent Number: 5,478,998
[45] Date of Patent: Dec. 26, 1995

[54] TILTING WALL-MOUNTED OPTICAL SCANNER

[75] Inventors: Harold Charych; Robert Doran, both of East Setauket, N.Y.

[73] Assignee: Symbol Technologies, Inc., Bohemia, N.Y.

[21] Appl. No.: 59,822

[22] Filed: May 10, 1993

[51] Int. Cl.$^6$ .................................................. G06K 7/10
[52] U.S. Cl. ........................ 235/462; 248/291.1
[58] Field of Search ........................ 362/147, 427; 235/462; 248/291, 185, 922, 923

[56] References Cited

U.S. PATENT DOCUMENTS

| | | | |
|---|---|---|---|
| 1,239,253 | 9/1917 | Buck | 248/291 |
| 2,602,863 | 7/1952 | Raymond et al. | 248/185 |
| 3,317,225 | 5/1967 | Cooper | 248/291 |
| 3,533,648 | 10/1970 | Thieberger | 362/427 |
| 4,988,851 | 1/1991 | Kohno et al. | 235/462 |
| 5,113,060 | 5/1992 | Wike et al. | 235/472 |
| 5,140,141 | 8/1992 | Inagaki et al. | 235/462 |
| 5,151,581 | 9/1992 | Krichever et al. | 235/467 |
| 5,192,857 | 3/1993 | Detwiler | 235/467 |

FOREIGN PATENT DOCUMENTS

| | | | |
|---|---|---|---|
| 412544 | 2/1991 | European Pat. Off. | 235/467 |
| 3-273494 | 12/1991 | Japan | 235/462 |
| 5-6451 | 1/1993 | Japan | 235/462 |

OTHER PUBLICATIONS

MS700 Projection Scanner, Metrologic brochure 18 May 1990.

*Primary Examiner*—John Shepperd
*Attorney, Agent, or Firm*—Fish & Richardson

[57] ABSTRACT

A wall-mounted, hands-free scanner capable of having its field of view adjusted using a pivot structure with a position-holding mechanism. The spacing of the field of view from the wall can be quickly adjusted to accommodate different size objects and different placement of indicia on objects. The scanner includes a base member configured to be installed on a vertical surface, a scanning unit including a light scanning source directing a light beam across a field of view toward an indicia located within the field of view, a pivot structure connecting the scanning unit to the base member (the pivot structure having a generally horizontal axis of rotation about which the scanning unit rotates relative to the base member), and a position-holding mechanism within the pivot structure. The scanning unit may be rotated relative to the base member to adjust the spacing of the field of view from the vertical surface, and the position-holding mechanism within the pivot structure maintains the scanning unit at a selected angular position. No tightening or other position-holding step is required following adjustment of angular position.

9 Claims, 7 Drawing Sheets

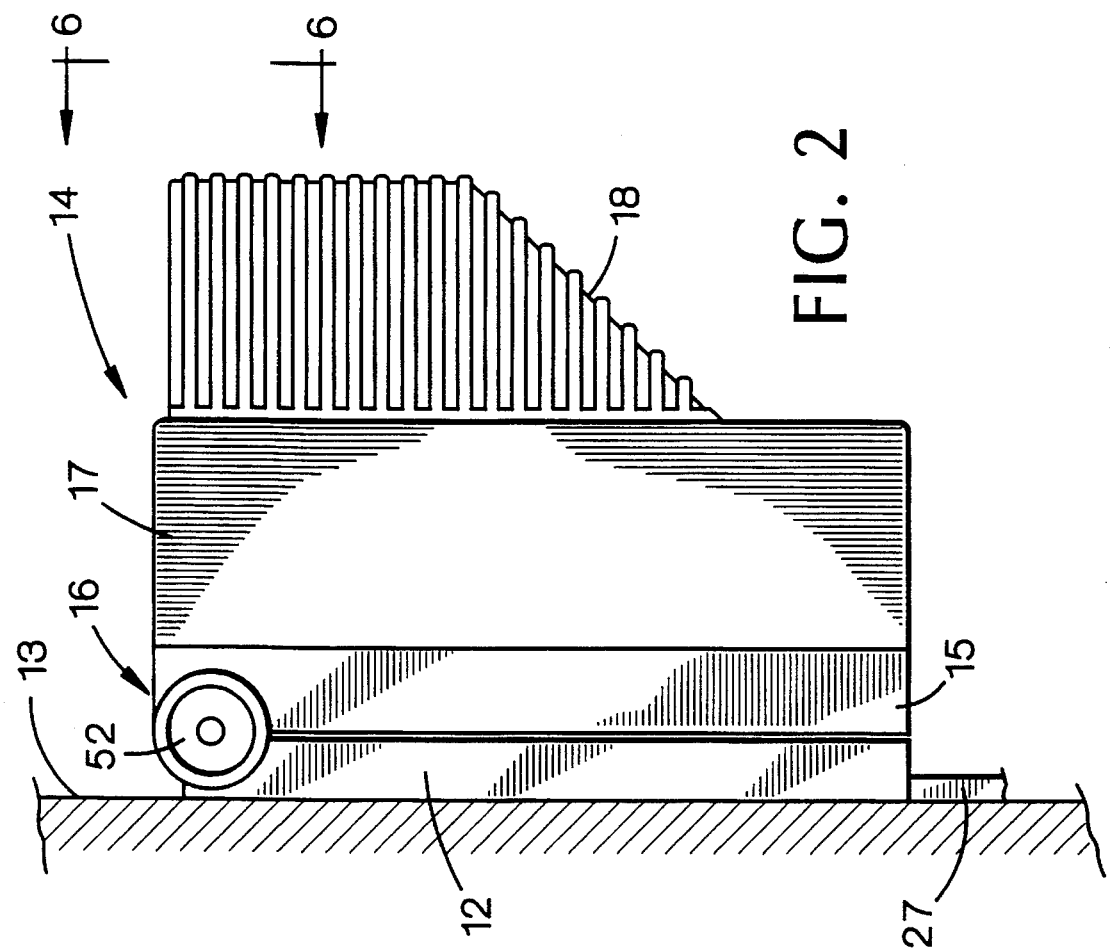
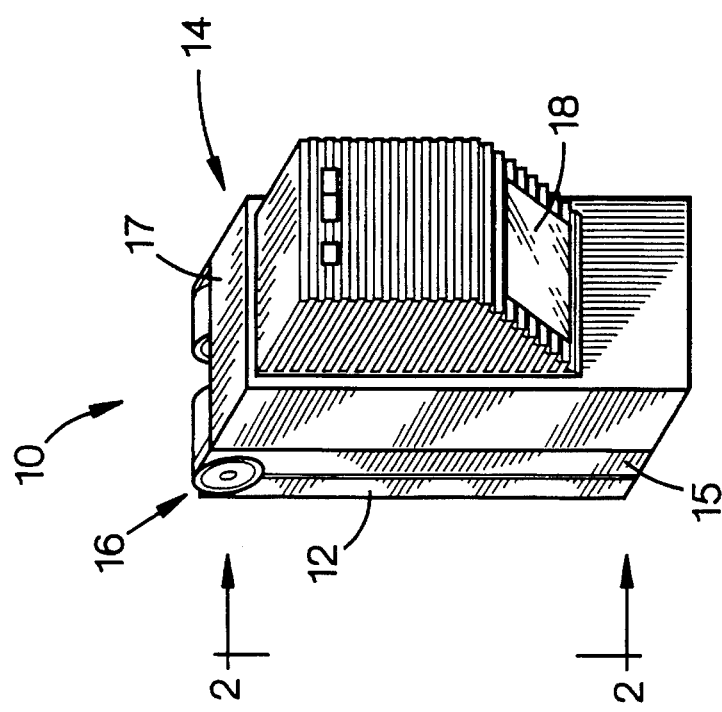

TILTING WALL-MOUNTED OPTICAL SCANNER

RELATIONSHIP TO OTHER APPLICATIONS

This application is related to copending U.S. application of James Giebel, Ser. No. 08/059,803, filed on even date herewith by the assignee, and entitled Object Sensor for an Optical Scanner (incorporated by reference).

BACKGROUND OF THE INVENTION

This invention relates to optical scanning, e.g., scanners for reading bar codes.

Targets having indicia of different light reflectivity, such as bar code symbols, have been scanned by directing a laser beam along an optical path to a symbol located in the vicinity of the reference plane lying generally normal to the optical path. The laser light reflected off the symbol is detected by a detector having a finite field of view or scanning field.

In the case of hand-held scanners, a scanner must be manually positioned relative to an object having a symbol in such a way as to ensure that the scanner's scanning field encompasses the symbol (or enough of the symbol to enable its decoding).

In many applications it is desirable to provide hands-free scanner operation, for example, in point-of-sale check-out systems of the type generally found in supermarkets. Hands-free operation is achieved in a number of ways. For example, in the case of point-of-sale checkout systems, it is well-known to mount symbol scanners underneath check-out counters. (See, for example, U.S. Pat. No. 3,978,317.) Portable, hand-held scanners can also be temporarily mounted (e.g., in a mounting stand as is shown in U.S. Pat. No. 4,766,297).

To scan a symbol using fixed-position or temporarily mounted scanner environments, the object having the symbol to be scanned must be manually positioned relative to the fixed-position scanner in order to move the symbol into the scanner's field of view.

Scanners with fixed-position fields of view have been mounted on vertical walls, to facilitate hands-free scanning of objects moved under them. The light beam emitted by such wall-mounted scanners is angled outwardly from the wall, in an effort to position the field of view far enough away from the wall to provide enough maneuvering room in which to move objects so that the indicia to be scanned can be brought within the field of view.

SUMMARY OF THE INVENTION

In general the invention features an improved wall-mounted, hands-free scanner that is capable of having its field of view easily adjusted using a pivot structure with a position-holding mechanism. The invention allows the spacing of the field of view from the wall to be quickly adjusted to accommodate different size objects and different placement of indicia on objects.

In one aspect, the invention features an optical scanning device comprising a base member configured to be installed on a vertical surface, a scanning unit including a light scanning source directing a light beam across a field of view toward an indicia located within the field of view, a pivot structure connecting the scanning unit to the base member (the pivot structure having a generally horizontal axis of rotation about which the scanning unit rotates relative to the base member), and a position-holding mechanism within the pivot structure. The scanning unit may be rotated relative to the base member to adjust the spacing of the field of view from the vertical surface, and the position-holding mechanism within the pivot structure maintains the scanning unit at a selected angular position. No tightening or other position-holding step is required following adjustment of angular position.

In preferred embodiments, the pivot structure is positioned at the upper end of the base member and scanning unit, and rotation of the scanning unit causes the lower end of the scanning unit to separate from the base member. The position-holding mechanism provides adjustment in discrete angular increments (preferably in the range of 2 to 10 degrees). The position-holding mechanism includes a pair of ratchet elements and a spring member forcing the elements into engagement. The ratchet elements have teeth set at an angular pitch in the range of 2 to 10 degrees. The ratchet elements and spring member are configured so that an audible clicking sound is made as each angular increment is made in rotating the scanning unit relative to the base member. A cable connecting the scanning unit to a source of electrical power and to external processing passes through the pivot structure hidden from view.

The invention provides a wall-mounted, hands-free scanner that overcomes difficulties inherent in prior art versions of such scanners. By providing a pivot structure with a position-holding mechanism, the invention makes it possible to use the same wall-mounted scanner for a wider range of objects, as the spacing of the field of view of the scanner from the wall can be easily adjusted. When the size of the object, or the placement of the indicia on the object, require a field of view further from the wall, the scanner can be tilted to a new position with one hand while the object is held with the other. The ratchet mechanism permits the tilt angle to be adjusted in small angular increments.

Other features and advantages of the invention will be apparent from the following description of preferred embodiments, and from the claims.

BRIEF DESCRIPTION OF THE DRAWINGS

FIG. 1 is a perspective view of the preferred embodiment, showing the scanning unit in an untilted orientation.

FIG. 2 is a side elevation view of the preferred embodiment taken along 2—2 in FIG. 1.

DESCRIPTION OF THE PREFERRED EMBODIMENTS

Figure 3:
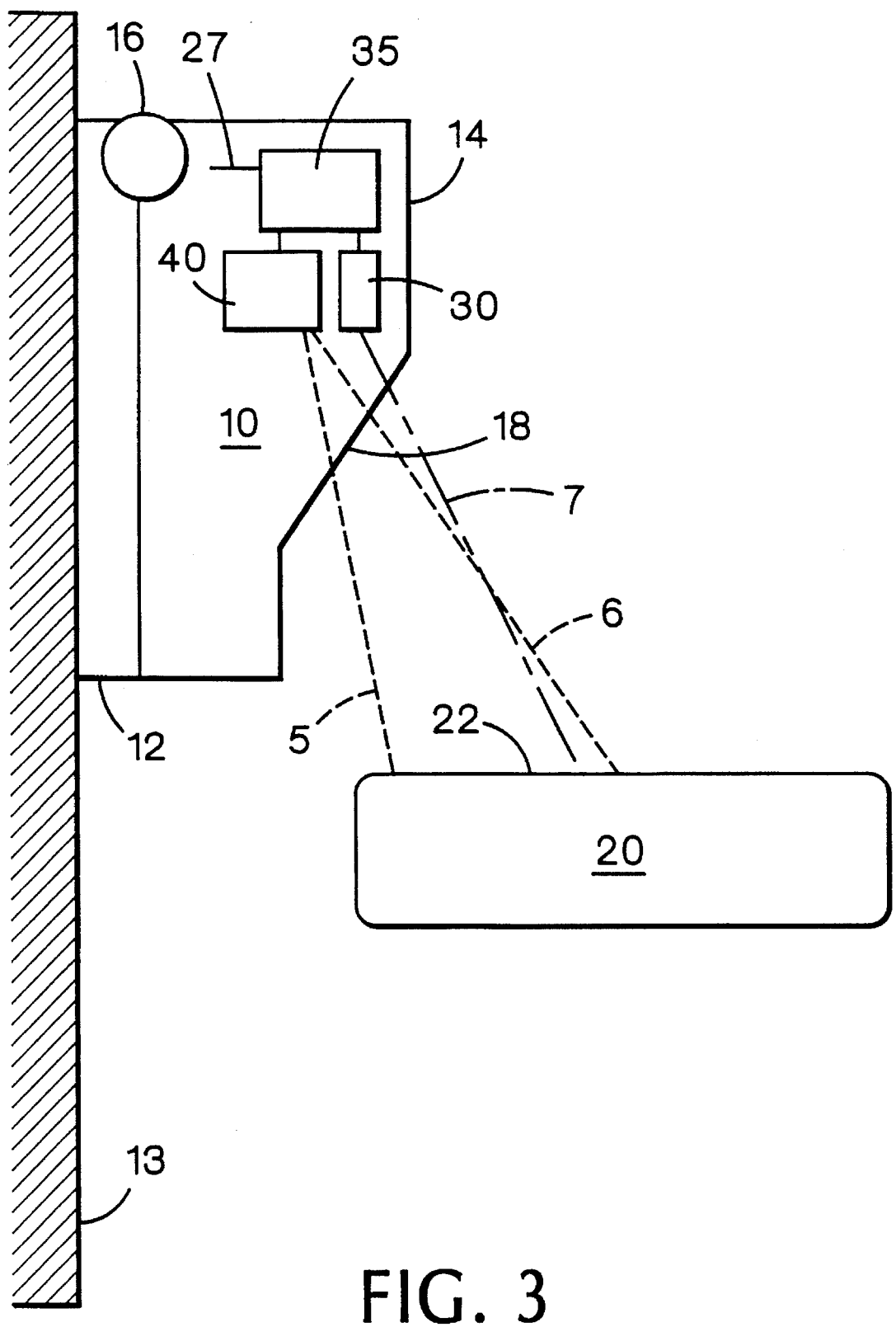
FIG. 3 is a somewhat diagrammatic side elevation view of the preferred embodiment.

Shown in FIGS. 1 and 2 is a wall mountable, adjustable tilting bar code scanner 10. The scanner includes a molded-plastic base member 12 installed on a vertical wall 13. An optical scanning unit 14 is connected to the base member by means of pivot structure 16. The scanning unit consists of a molded-plastic lower portion 15, an electronics/scanning assembly (not shown), and a molded-plastic cover 17.

As shown in FIG. 3, the electronics/scanning assembly includes an electro-optical scanning mechanism 40, an object sensor 30, and control/power circuitry 35 (shown diagrammatically as functional blocks in the figure). A light pattern generated by a laser beam from the scanning mechanism 40 is emitted through a glass covered window 18 on the front sloping surface of the cover 17. When the light beam reflects off an object in its path, the reflected light is passed back into scanning unit 14 through window 18 to the scanning mechanism 40 for processing. An object sensor 30 emits a separate beam 7, and detects changes in reflected light for sensing the presence of an object and activating the scanning mechanism 40. A more complete description of the object sensor is found in copending U.S. application of James Giebel, Ser. No. 08/059,803, filed on even date herewith by the assignee, and entitled Object Sensor for an Optical Scanner (incorporated by reference).

An electrical cable 27 (carrying power and signals) passes from within the scanning unit 14, through the pivot structure 16 (hidden from view), and down through the back of base member 12. The cable optionally passes through an external switch (not shown), and then to a decoder (also not shown).

Figure 4:
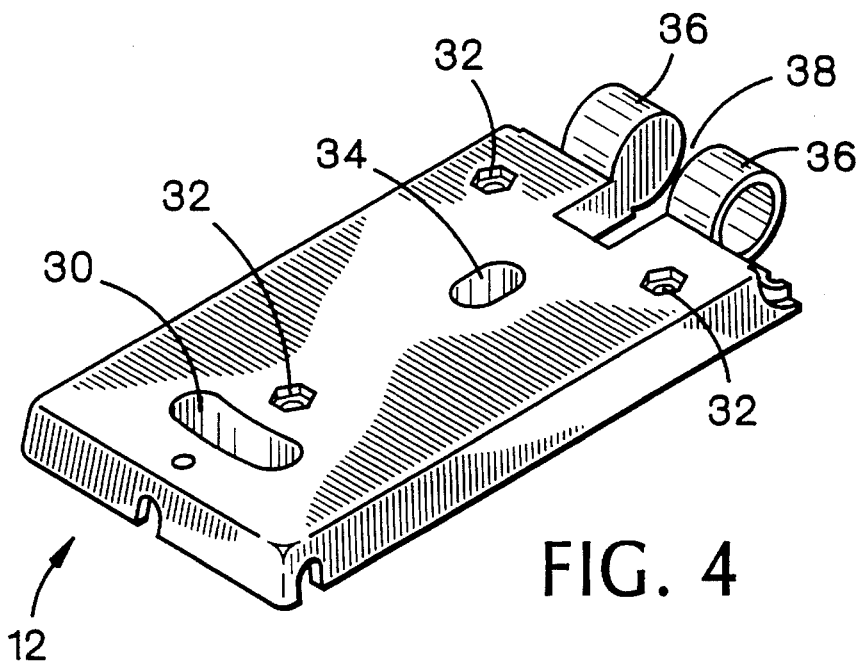
FIG. 4 is a perspective view of the base member, which is attached to the wall.

Base member 12 is shown separately in FIG. 4. It is attached to a vertical wall using fasteners, which may be inserted through holes 32, or through holes 30, 34. Hole 30 is arcuate in shape to provide for adjustment of the angular orientation of the unit on the wall. At the upper end of the base member there are two integrally-molded, cylindrical members 36, which form part of the pivot structure. Between these two members is an opening 38 through which cable 27 passes.

Figure 5:
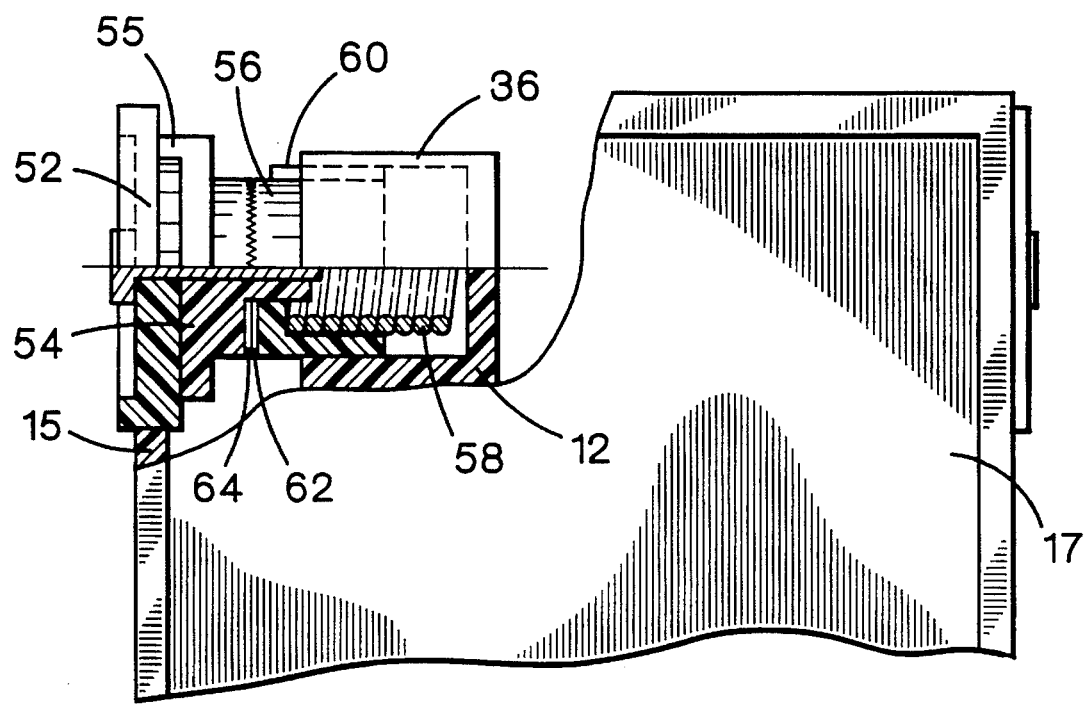
FIG. 5 is an elevation view, partially in cross section (looking in the direction indicated by 6—6 in FIG. 2), showing the pivot structure.
Figure 5A:
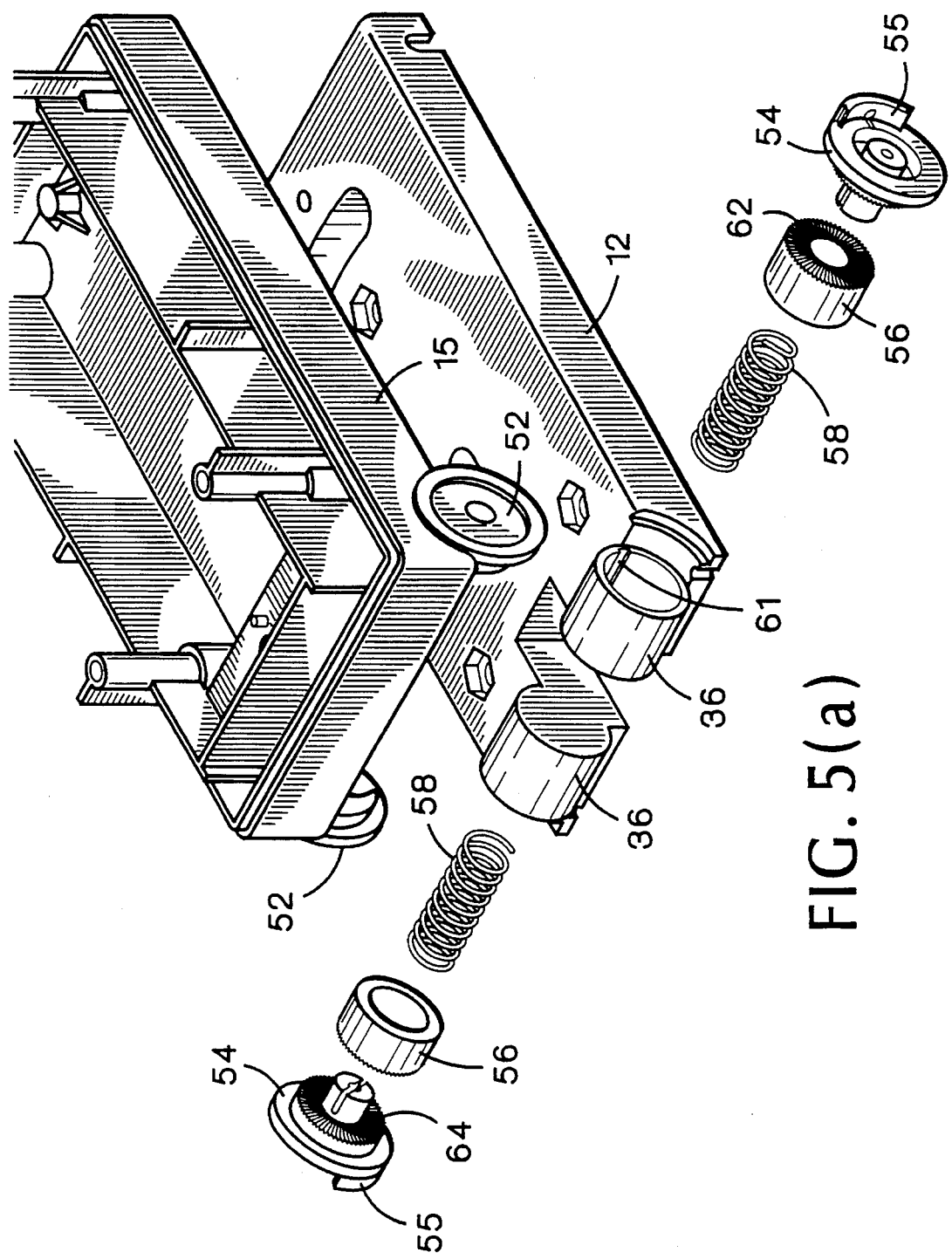
FIG. 5A is an exploded view showing the pivot structure (only lower unit 15 of the scanning unit is shown).
Figure 6A:
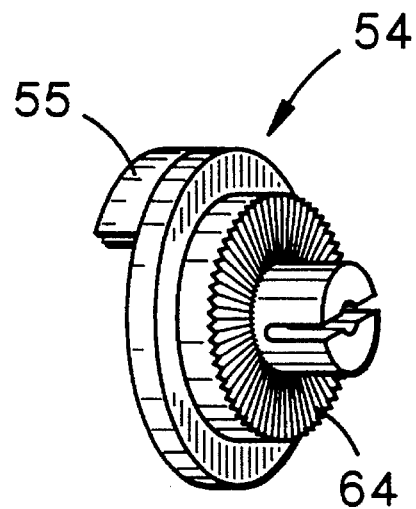
FIGS. 6A and 6B are perspective views, from two different vantage points, of one type of ratchet member used in the pivot structure.
Figure 6B:
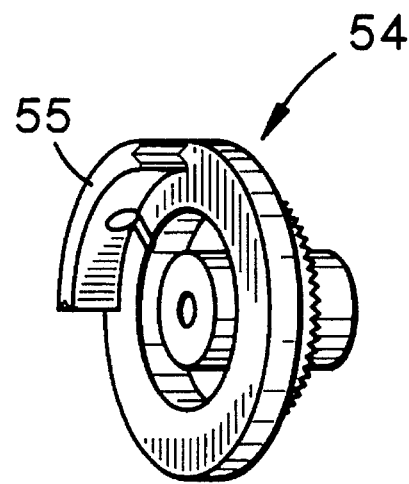
Figure 7:
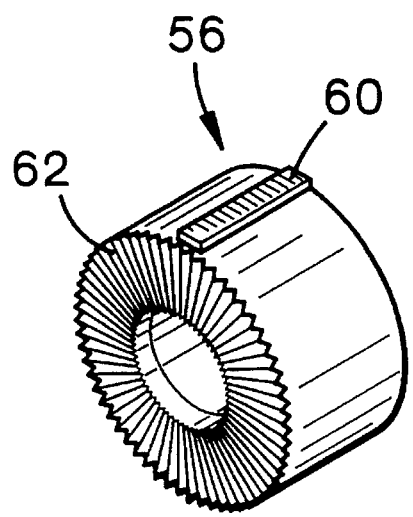
FIG. 7 is a perspective view of the other type of ratchet member used in the pivot structure.

The pivot structure is shown in FIGS. 5 and 5A. A pair of ratchet elements 54, 56 (FIGS. 6A, 6B, 7), pressed together by a spring 58, provide a position-holding mechanism. (In FIG. 5 one-half of the pivot mechanism is exposed by cutting away the cover 17 and lower unit 15 of the scanning unit, and in the exposed portion of the pivot structure, the lower half of the structure is cross sectioned.) The ratchet elements 54, 56 and spring 58 are positioned between extensions of the scanning unit 14 and base member 12. Extensions 52 of the scanning unit are integrally-molded circular elements at either side of the lower unit 15. Extensions 36 of the base member are cylindrical elements 36, each of which faces a respective circular element 52 of the scanning unit. Positioned between each pair of extensions 36, 52 are the two ratchet elements 54, 56 and spring 58. Spring 58 (a coil, compression spring) is installed in the interior of each cylindrical element 36, and presses outwardly against ratchet element 56, which in turn presses against ratchet element 54. To prevent the ratchet elements from rotating relative to the structural member (base member 12 or scanning unit 14) with which they are associated, integrally-molded key formations 55, 60 are formed on each ratchet element. Key formation 55 on the outer ratchet element 54 fits into a matching cavity in circular element 52. Key formation 60 on the inner ratchet element 55 fits into a matching slot 61 (FIG. 5A) within the interior of cylindrical element 36.

In operation, the scanning unit 14 is easily tilted by hand to any desired position, and the selected position is maintained by the pivot structure without the need for additional tightening or other adjustments (i.e., a position-holding mechanism is provided). Engagement of the teeth 62, 64 of the ratchet elements maintains the selected position. During movement between positions, spring 58 enables the ratchet elements to separate apart sufficiently to allow the teeth to slip. The teeth are set a 5 degree angular pitch, and provide an audible clicking sound for each 5 degrees of rotation (as the ratchet elements spread apart and fall back together). The 5 degree angular pitch of the teeth means that the tilt of the scanning unit is adjustable in 5 degree increments. Other adjustment increments can be provided (preferably in the range of 2 to 10 degrees) by changing the angular pitch of the teeth.

Figure 8:
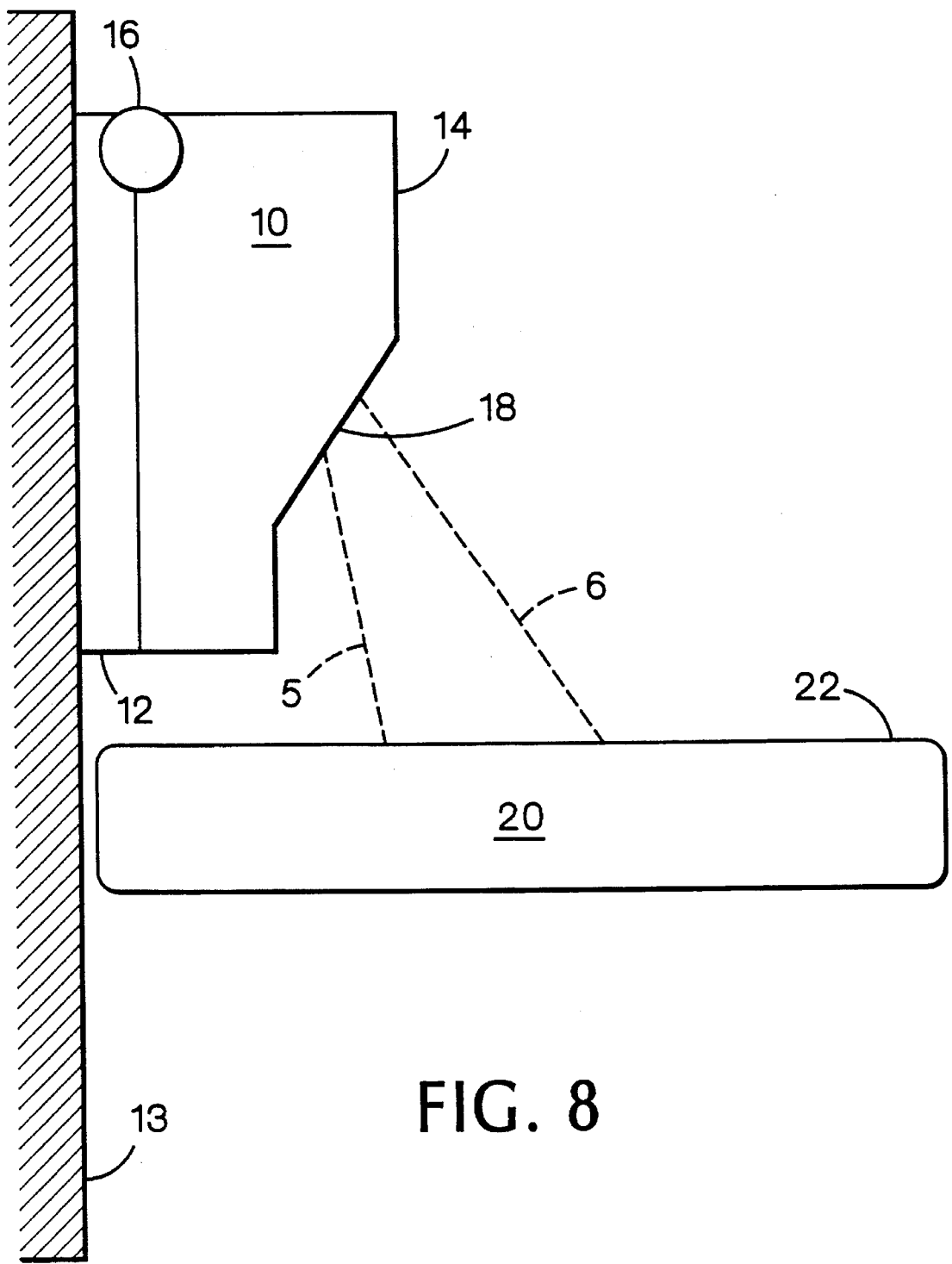
FIG. 8 is a diagrammatic side elevation view of the preferred embodiment, showing an object being scanned.
Figure 9:
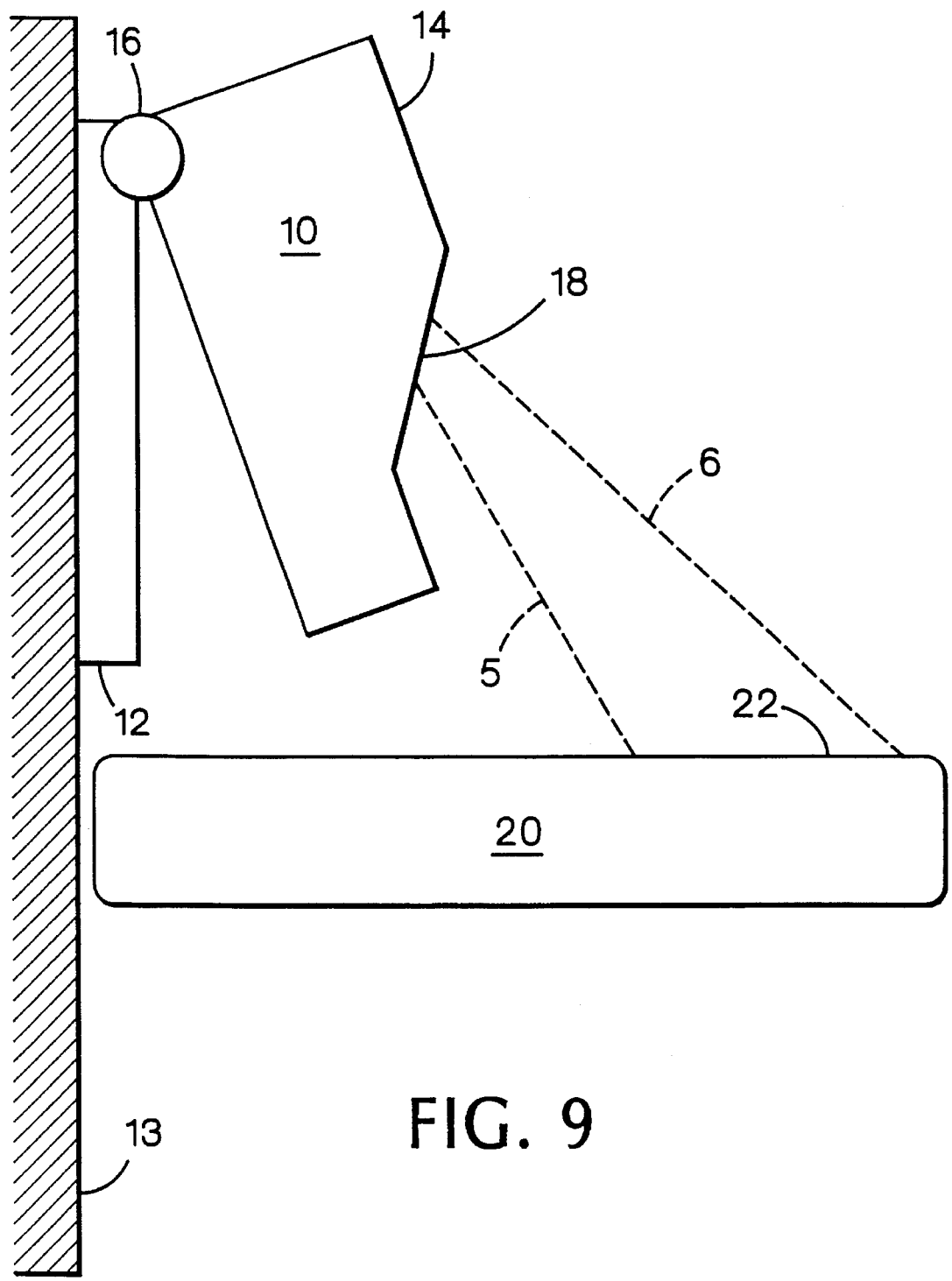
FIG. 9 is a diagrammatic side elevation view of the preferred embodiment, showing an object being scanned.

As illustrated in FIGS. 3, 8, and 9, the light beam emitted by the scanning unit defines a field of view, shown diagrammatically by lines 5, 6. The width of the field of view will depend on the nature of the scan pattern emitted by the scanning unit. If the pattern is a simple linear sweep, then the field of view will be narrow (and more accurately shown as a single line). If, on the other hand, the pattern consists of multiple scan lines (as shown in the parent application, now issued as U.S. Pat. No. 5,151,581), or if it is a two-dimensional scan pattern for decoding two-dimensional symbols, the field of view will look more like what is shown in the figures. Any or all of these scan patterns can be used with the invention.

FIGS. 3, 8 and 9 illustrate the advantage of being able to title the scanning unit. For small objects, as suggested by the object shown in FIG. 3, no tilting of the scanning unit is necessary, as indicia 22 on the object can be read at any location on the surface of the object. But for larger objects, as suggested by the object in FIGS. 8, there will be locations at which the indicia 22 cannot be read without tilting. (In FIG. 8, it would appear that the object might be turned around to bring the indicia within the field of view, but such maneuvering of the object will not, in general, always be possible, and with even larger objects there will be locations that no amount of maneuvering will bring within the field of view). FIG. 9 shows that, by tilting the scanning unit through an appropriate angle, the field of view can be moved sufficiently far enough away from the wall to reach the indicia.

Other embodiments of the invention are within the following claims.

What is claimed is:

1. An optical scanning device for reading indicia of a type having regions of different light reflectivity, the device comprising:

a base member configured to be installed on a vertical surface;

a scanning unit including a light scanning source directing a light beam across a field of view toward an indicia located within the field of view;

a pivot structure connecting the scanning unit to the base member, the pivot structure having a generally horizontal axis of rotation about which the scanning unit rotates, relative to the base member, from a first scanning position in which the scanning unit with the field of view close to the wall is substantially flush against the base unit through a range of positions along a one-dimensional path to a final scanning position with the field of view moving progressively further from the wall; and a position-holding mechanism within the pivot structure;

wherein the scanning unit is configured so that it may be rotated in a single-handed operation relative to the base member to adjust the spacing of the field of view from the vertical surface and wherein the position-holding mechanism within the pivot structure maintains the scanning unit at a selected angular position without tightening and without further adjustment of the mechanism.

2. The scanning device of claim 1 wherein the pivot structure is positioned at the upper end of the base member and scanning unit and rotation of the scanning unit separates the lower end of the unit from the base member.

3. The scanning device of claim 2 wherein the position-holding mechanism comprises a pair of ratchet elements and a spring member forcing the elements into engagement.

4. The scanning device of claim 3 wherein the ratchet elements have teeth set at an angular pitch in the range of 2 to 10 degrees.

5. The scanning device of claim 4 wherein the ratchet elements and spring member are configured so that an audible clicking sound is made as each angular increment is made in rotating the scanning unit relative to the base member.

6. The scanning device of claim 5 wherein a cable connecting the scanning unit to a source of electrical power and to external processing passes through the pivot structure hidden from view.

7. The scanning device of claim 1 wherein the position-holding mechanism provides adjustment in discrete angular increments.

8. The scanning device of claim 7 wherein the discrete angular increments are in the range of 2 to 10 degrees.

9. The scanning device of claim 1 wherein the position-holding mechanism comprises a pair of ratchet elements and a spring member forcing the elements into engagement.

* * * * *